INVENTORS.
WILLIAM P. OEHLER
CHARLES H. YOUNGBERG

ATTORNEYS

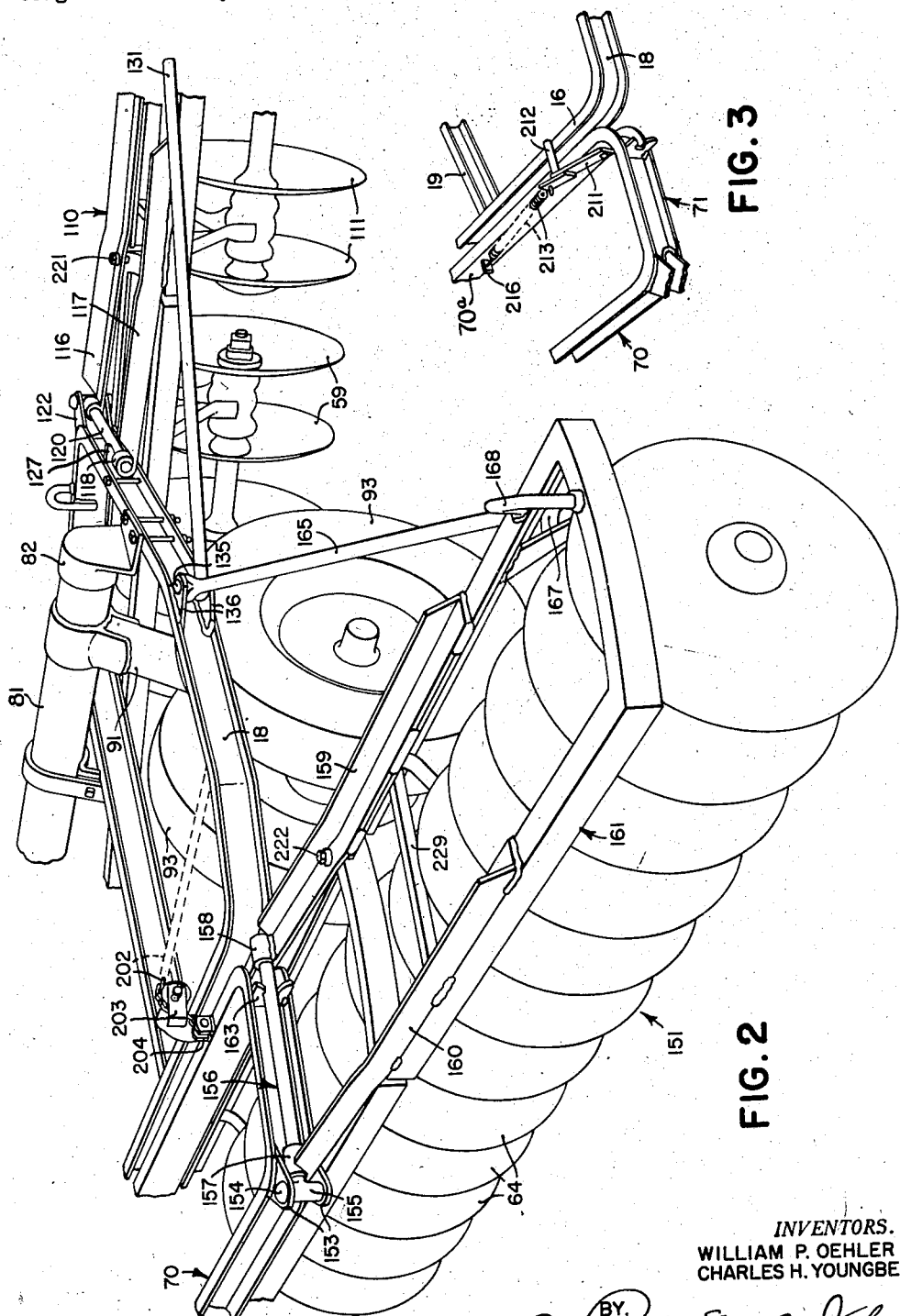

United States Patent Office 2,881,578
Patented Apr. 14, 1959

2,881,578

DISK HARROW WITH EXTENSION GANGS AND WHEEL FRAME

William P. Oehler and Charles H. Youngberg, Moline, Ill., assignors, by mesne assignments, to Deere & Company, a corporation of Delaware Original application May 10, 1955, Serial No. 507,274. Divided and this application June 18, 1956, Serial No. 591,921

10 Claims. (Cl. 172—397)

This application is a division of our copending application, Ser. No. 507,274, filed May 10, 1955.

The present invention relates generally to agricultural implements and more particularly to disk harrows of the double acting or tandem type with wheel frame.

The object and general nature of the present invention is the provision of a substantially rigid wheel type harrow so constructed and arranged that the rear disk gang assembly, including both right- and left-hand disk gangs, is permitted to swing relative to the first gang assembly about a generally fore-and-aft extending centrally located longitudinal axis, whereby the harrow is enabled to operate at substantially uniform depths even though the ground surface is uneven and irregular.

A further feature of this invention is the provision of a disk harrow of the foregoing type, having means to prevent the rear disk gang assembly from moving about the longitudinal axis when the harrow is raised on its supporting wheels for transport, in which position both the front and rear gang assemblies are held out of contact with the ground. A still further feature of this invention is the provision of means acting to hold the rear gang assembly against pivoting when the harrow is in its transport position, which means is connected with the supporting wheel means whereby the movement of the latter into a lowered or transport position, raising the frame and disk gangs, automatically effects a stop or limit to the permissive movement of the rear gangs.

These and other objects and advantages of the present invention will be apparent to those skilled in the art after a consideration of the following detailed description, taken in conjunction with the accompanying drawings, in which:

Fig. 2 is an enlarged fragmentary perspective view showing the right-hand rear extension gang in its extended or operating position.

Fig. 3 is a fragmentary view of a modified form of rear gang assembly lock.

Figure 1:
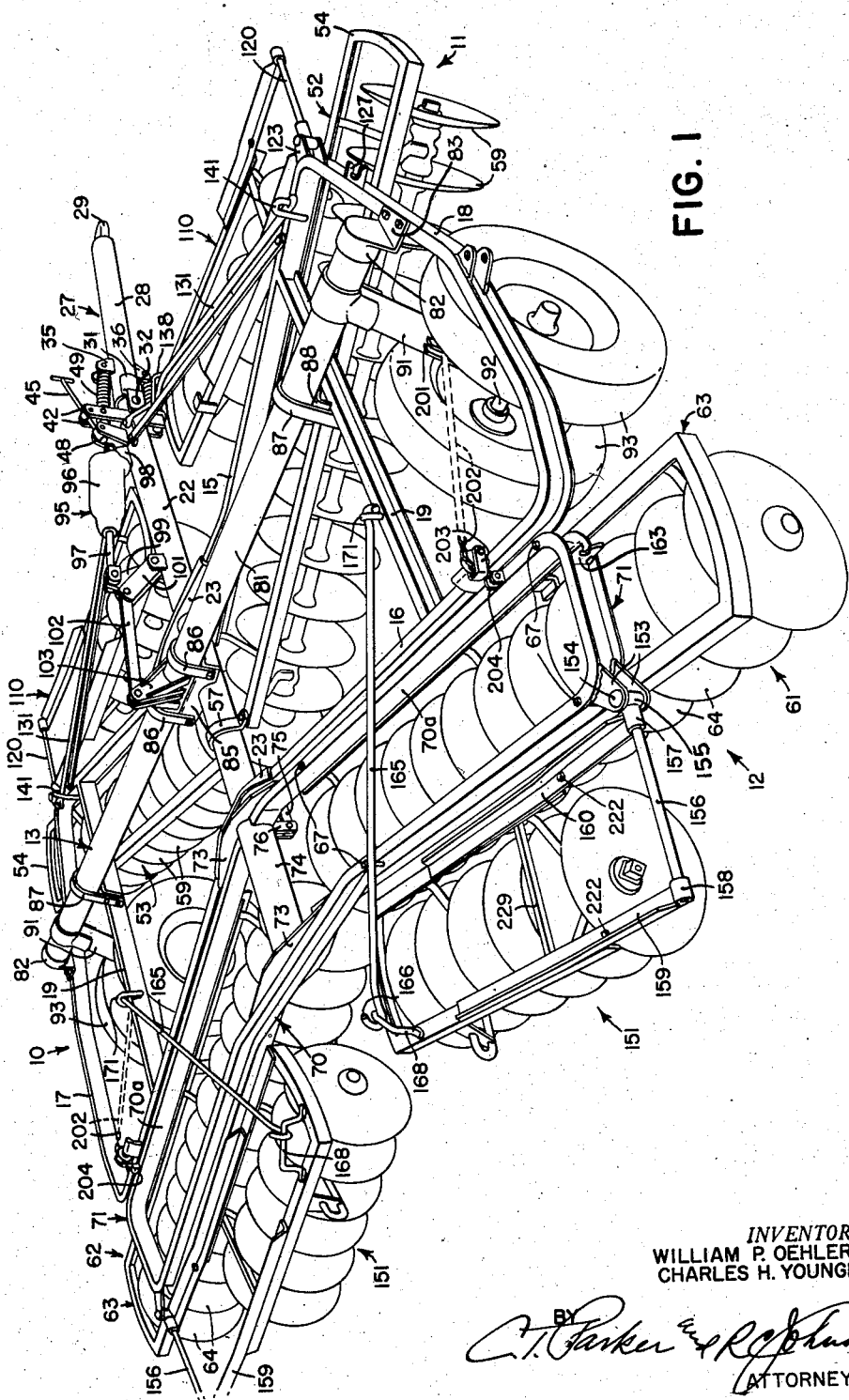
Fig. 1 is a perspective view of a wheel type double-action harrow in which the principles of the present invention have been incorporated, the harrow being viewed from the right rear portion and the extension gangs being shown in their folded position.

Referring first to Fig. 1, the disk harrow of the present invention comprises a main frame 10, a front gang assembly 11 and a rear gang assembly 12, the frame and gang assemblies being supported, especially in transport, by a wheel frame means 13. The main frame means 10 comprises a generally horizontal frame of generally hourglass configuration and made up of suitably interconnected front and rear frame bars 15 and 16 and end bars 17 and 18. Preferably, these frame bars are in the form of channels suitably welded or otherwise rigidly interconnected to form a strong rigid frame. The front and rear bars 15 and 16 may be interconnected by a plurality of crossbars 19. Also forming a part of the main frame 10 is a central generally fore-and-aft extending pipe member 22 to which front and rear connecting plates 23 are secured, as by welding, the frame bars 15 and 16 being connected, as by bolts, to the pipe brackets 23. A front drawbar 27 forms a part of the main frame structure and comprises a pipe member 28 having a swivel or other suitable connection 29 at its front end by which the implement may be connected to a tractor or other suitable source of power. At its rear end the drawbar pipe 28 carries a pair of laterally spaced apart arms 31 that are apertured and receive a pivot member 32 carried by similar brackets fixed, as by welding, to the forward end of the main frame pipe member 22. The rear end of the drawbar pipe member 28 also carries upper and lower pairs 35 and 36 of spring-receiving brackets, each pair of which is apertured to receive a trunnion member through which the front end of an associated spring-carrying rod is extended. The rear end of each of the rods is formed as an eye and is swingably carried by a pivot member fixed or otherwise supported by a pair of vertical bars 42 mounted for swinging movement on or, if desired, supported by the pivot member 32. The position of the vertical bars 42 relative to the front end of the main frame member 22 is controlled by adjusting means which includes a generally fore-and-aft extending adjusting screw 45 extending through threaded swivels, one carried by the upper end of the adjustable bars 42 and the other supported by bracket means 48 welded or otherwise fixed to the front end of the frame pipe member 22. Thus, by turning the member 45 in one direction or the other, the angular position of the spring-receiving member 42, movable about an axis defined by the pivot pin 32, may be adjusted so as to change the reaction point of a pair of upper and lower compression springs 49 that are mounted on the rods 38. The function of the springs 49 and associated parts is to yieldingly hold the front frame or drawbar member 28 in the proper position relative to the frame of the harrow, whereby the connecting swivel 29 may be disposed at the proper elevation to receive the drawbar of the tractor that propels the implement. In other words, turning the adjusting member 45 adapts the front end of the drawbar 28 to the height of the drawbar of the tractor to which the implement is to be connected.

The front gang assembly 11 comprises main disk gang means including a right-hand main disk gang 52 and a left-hand main disk gang 53, each including a gang frame 54 fixed in any suitable way to the main frame 10 so as to form a rigid part thereof. The inner ends of the rear bars of the gang frames 54 are connected directly to the fore-and-aft extending main pipe member 22 by a bracket 57. Each of the main disk gangs 52 and 53 includes a plurality of ground-working disks 59 arranged in generally conventional manner, the gangs being disposed at an angle to the direction of forward travel, which angle is in this type of harrow nonadjustable.

The rear main disk gangs are indicated at 61 and 62 and each includes a main disk gang frame 63 and generally conventionally arranged disks 64. The rear disk gang frames 63 are not fixed rigidly to the main frame 10, as are the front main disk gang frames 54, but instead the two rear disk gang frames 63 are fixed in any suitable way, as by bolts 67, to a transversely disposed oscillatable frame 70 that is made up of suitably interconnected, right- and left-hand generally U-shaped frame members 71, preferably in the form of channel members bent into the desired U-shaped configuration. The inner end portions of the U-shaped frame members are fixed to front and rear brackets 73, and the latter in turn are welded to a short pipe section 74 that is rockably mounted on the rear end of the main frame pipe member 22, which end of the pipe member 22 extends rearwardly beyond the rear main frame section 16 and into the pipe member 74, whereby the latter is rockably supported thereon. The rear gang assembly is held onto the rear end of the pipe 22 by means of a tie link 75 loosely connected at its rear end to a pair of lugs 76 fixed to the forward portion of the pipe member 74 and at its forward end to a similar pair of lugs (not shown) welded or otherwise fixed to the rear portion of the main frame pipe member 22.

The supporting means for carrying the disk harrow in transport includes the wheel frame structure 13 mentioned above. The wheel frame means 13 comprises a generally transversely extending pipe member 81 the ends of which are rockably mounted in socket-type bearings 82 fixed, as at 83, to the associated main frame end members 17 and 18. Also, the wheel frame pipe member 81 is mounted for rocking movement at its central portion on a saddle member 85 and held in place thereon by a pair of straps 86 bolted or otherwise connected to the saddle member 85. A similar strap member 87 connects each end portion of the wheel frame pipe member 81 with a saddle member 88 that is fixed to the associated main frame cross member 19. Fixed to each end of the rockable wheel frame pipe member 81 is a wheel carrying arm member 91 to the lower end of which a transversely disposed axle 92 is connected. Mounted on each end of each of the axles 92 is a ground wheel 93, preferably one having a pneumatic tire. Normally, as best shown in Fig. 1, the wheel arms 91 extend generally downwardly and rearwardly, the arms 91 and wheels 93 being shiftable downwardly and forwardly to raise the frame and disk gangs into their transport position.

The wheel frame unit 13, including the ground-engaging wheels 93, is shifted by a hydraulic power unit 95 that includes a cylinder 96 and a piston rod 97. The front end of the cylinder unit is pivotally connected to bracket means 98 fixed to the forward portion of the main frame pipe 22, and the piston rod 97 is connected at its rear end to a loose link 99 that is detachably connected with arm means 101 that, in turn, is connected with the forward end of a link member 102, the rear end of which is pivotally connected to an arm 103, preferably in the form of a pair of brackets, fixed to the generally central portion of the wheel frame pipe member 81. Fluid under pressure is delivered to and discharged from the cylinder 96 by a pair of hose lines (not shown), the latter being usually connected to the power lift system that forms a part of the tractor to which the implement is connected. Under control of suitable valve means on the tractor, the power lift unit 95 may be extended or retracted and, as a consequence thereof, the wheel frame 13 is rocked to raise or lower the frame 10 on the ground wheels 93.

Normally, the adjusting member 45 is turned to such a position that the draft member 28 extends downwardly and forwardly from its connection with the front end of the harrow pipe member 22, the springs 49 being arranged to hold the drawbar 28 of the harrow in this position. This provides means operating automatically to maintain the frame 10 in a generally horizontal position, for the deeper the disks are permitted to cut into the ground, the greater the traction or amount of draft, and the greater the draft, the more the upper spring 49 yields to permit the drawbar 28 to swing upwardly about its transverse pivotal connection 32 with the main frame pipe member 22, thus tending to hold the frame 10 in a level position. Also, when the wheels are lowered to elevate the frame means and associated gangs to a transport position, the springs 49 act as cushioning means for permitting the harrow some flexibility, so far as rocking about the point of support of the wheels on the ground is concerned, but the springs 49 also serve as stabilizing means to prevent excessive oscillation of the harrow about its wheels during transport.

A complete harrow may be constructed as described above, but where the larger tractors are available, there is sufficient power to work a wider strip of ground than the width of just the main frame gangs 11 and 12. According to the principles of the present invention, for farmers who have the larger tractors, extension gangs are provided, one for the outer end of each of the main frame gangs, and these extension gangs may be arranged in extended position for operation, and in folded position to permit the implement to be drawn through gates, narrow lanes and the like. The extension gangs are shown in more detail and claimed in our parent application, identified above. However, for purposes of the present disclosure, it will suffice to note that each of the extension gangs for the front main gangs is indicated by the reference numeral 110 and is mounted on the associated main gang for swinging movement relative thereto on a pivot member 120, the latter comprising a rod-like part that is mounted for swinging about a vertical pivot on a pair of brackets 123 fixed, as by welding, to the forward laterally outer corner portion of the associated main frame 10. When the front frame extension gangs are extended, there being one of the extension gangs 110 at each side of the implement, the disks 111 are disposed in axially outwardly aligned relation with respect to the disks 59 of the front disk gang means, and the forward end of the swingable pivot member 120 of each extension gang is received in a notched bracket 127 that is welded to the adjacent portion of the main frame end bar 17, or 18, at each side of the implement. A draft link 131 is connected between each extension gang 110 and the main frame 10, when the extension gangs are extended, as is illustrated in the parent application, and when it is desired to have the extension gangs 110 folded inwardly, as shown in Figure 1 in this application, each link or rod member 131 is passed under a handle 138 at the outer end of the associated extension gang frame and the ends of the link 131 connected to suitable lugs on the associated front frame bar 15 and the pipe member 28 whereby the link 131 serves as means carrying the outer end of each extension gang in its forward position directly on the main frame.

The rear extension gangs are each indicated by the reference numeral 151 and are of generally identical construction with the front extension gangs in most particulars. The rear extension gangs 151 are swingable into folded position rearwardly of the associated main disk gang means, as shown in Figure 1, and are also swingable into a forward or aligned position, as shown in Figure 2. Each outer end of the oscillating frame 70 is provided with a pair of brackets 153, one at each corner of the frame 70, each pair of brackets being apertured to receive a pivot pin 154 that is also disposed in the sleeve section 155 of an associated pivot member 156 that is normally disposed transversely of the associated gang frame. The pivot member 156 is substantially identical with the pivot member 120 described above in connection with the front extension gangs. The rear extension gang 151 is mounted on the associated pivot member 156 by means of eye sections 157 and 158 that are formed on the laterally inner ends of a pair of frame bars 159 and 160 that are secured, as by welding or the like, to the gang frame 161 of the rear gang extension 151. The outer end of the oscillating frame 70, forwardly of the brackets 153, carries a notched bracket 163 to receive the forward portion of the pivot member 156 when the extension gang is in its extended or working position.

When the extension gang 151 is in its folded position, the hook end 166 of the link 165 may be engaged with a handle portion 168, as shown in Fig. 1, and the forward end of the link 165 may be connected with a U-shaped bracket 171 formed on the rear portion of the associated main frame bar 19. The link 165 in this position passes over the rear bar 16 of the main frame, and also over the rear portion of the oscillating frame 70, and thus reacts against the main frame structure to hold the laterally inner end (folded position) of the extension gang 151 in supported relation on the main frame structure, so that when the main frame is lifted by the lowering of the ground wheels 93, the extension gang 151 is also raised and held in a plane generally parallel to the main frame structure. In its folded position, the laterally outer end of the extension gang is carried through the pivot member 156 by the brackets 153.

The left-hand extension gang 151, as shown in Fig. 1, is substantially identical with the right-hand extension gang as just described. Parts of the left-hand extension gang that correspond to the parts described above of the right-hand rear extension gang have been indicated by the corresponding reference numerals.

When the extension gangs are in their extended or operating positions aligned with the corresponding gangs of the main frame, the rear disk gang assembly as a whole pivots on its support on the rear end of the pipe member 22 and in this way accommodates use of the harrow over undulating or uneven ground. That is, the rear disk gang assembly as a whole may swing about a generally fore-and-aft extending axis relative to the front gang assembly and of course the front gang assembly may swing about a generally fore-and-aft extending axis with respect to the propelling tractor, since the connection at 29 is sufficiently loose to allow such relative movement. Therefore, even though the harrow of the present invention is fairly wide, the same operates more or less with satisfactory uniformity even though the ground is uneven. When the harrow is to be transported, with the disks out of contact with the ground, the power unit 95 is operated to lower the wheels 93, and thus raise the main frame and all parts connected therewith upwardly into a transport position. However, when in transport, it is not desirable to permit the rear disk gang assembly to pivot on the rear end of the bar 22. Also, especially when the extension gangs are in their extended position, it is not desirable to subject the rear end of the pipe member 22 to all of the weight of the rear disk gang assembly. Accordingly, we provide means actuated by the forward and downward swinging of the wheel arms 91 to lock out or prevent any oscillation of the frame 70 relative to the main frame 10, and we further employ the aforesaid means to transmit some of the weight of the frame 70 and associated parts directly to the main frame 10 independently of the support of the frame 70 at its central portion on the pipe member 22. Such means form an important part of the present invention and will now be described.

Secured to the rear side of each of the wheel arms 91 is a bracket means 201 to which the forward end of a lifting and stabilizing chain 202 is connected. The rear portion of the chain 202 extends over a roller and bracket structure 203 carried by the rear bar 16 of the main frame 10, and then extends downwardly to a point of connection to the adjacent portion of the oscillating rear frame 70, such connection being effected by a bracket 204 and associated chain-receiving pin means. As will be seen from Fig. 1, there is a stabilizing chain 202 with associated parts at each side of the implement, and the lengths of the chains 202 are such that when the harrow is in an operating position and the wheel arms 91 are generally horizontal, the chains 202 associated therewith are sufficiently slack to permit the entire rear gang assembly to rock, when required by the unevenness of the ground over which the outfit passes, about the axis defined by the rear portion of the main frame pipe member 22. However, when the implement is raised into a transport position and the wheel arms 91 swung downwardly and forwardly, as shown in Figs. 1 and 2, a pull is exerted through the chains 202 which takes out the slack in the chains and pulls up on the ends of the rear gang assem-bly frame 70, thus not only eliminating any further oscillation of the frame 70 but also relieving the center pivot member (rear of pipe 22) of the weight of the rear gang assembly and transferring it to the main frame through the brackets 203. The feature of permitting the rear gang assembly to oscillate during operation but preventing the oscillation when raised and also relieving the center pivot of at least a portion of the weight of the rear gang assembly when the harrow is in transport is an important feature of the present invention.

In some cases, as when, for example, the extension gangs 110 and 151 are not employed, it may not be necessary to relieve the rear portion of the pipe 22 of the weight of the rear gang assembly, and in that case a somewhat simpler oscillation lock-out means may be employed. For example, referring now to Fig. 3, we secure to each end of the forward bar 70a a swingably mounted arm 211 having a stud 212 overlying the adjacent portion of the rear bar 16 of the main frame 10. A spring 213 is connected at one end to the upper end of the arm 211 and at its other end is anchored, as at 216, to the frame 70. The springs 213 are arranged under sufficient tension to pull the studs 212 down against the adjacent bar of the main frame structure so that, when the harrow is arranged for transport, the frame 70 is held against movement about its support on the pipe member 22. However, the springs 213 do not prevent movement of the rear gang assembly in operating position so that the harrow is capable of following uneven ground surfaces when such conditions prevail.

As will be clear from Fig. 2, the disks of the front extension gangs 110 face outwardly while the disks of the rear extension gangs face inwardly, each of these extension gangs being freely pivoted about the respective hinged connecting rods 120 and 156. Since the soil pressure acting against the lower portions of the disks 111 of the front extension gangs acts to hold the outer ends of the extension gangs downwardly, no additional holding means is necessary. Further, the angles 116 and 117 of the front extension gangs are each provided with an adjustable set screw 221 that, as can be seen from Fig. 2, cooperates with the adjacent end of the inner gang frame for determining the level of the extension gangs relative to the inner gangs. Likewise, the angles 159 and 160 of the rear extension gangs are provided with similar set screw leveling means 222.

In the case of the rear extension gang, the soil pressure acting against the lower portions of the disks acts outwardly, and this tends to cause the laterally outer ends of the rear extension gangs to be displaced upwardly. In order to prevent undesirable upward displacement, we provide the rear extension gang of our disk harrow with the upthrust-resisting means shown and claimed, along with the other related features, in the parent application identified above. Such upthrust-resisting means may, for example, be connected to act between an outer portion of the oscillatable frame 70 and a crossbar 229 that forms a portion of each extension gang frame.

While we have shown and described above the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. In a wheel harrow, a frame, wheel-carrying arm means swingably connected with said frame, gang means swingably connected with said frame for movement relative thereto about a generally fore-and-aft extending axis, and means connected to act between the frame and said gang means to prevent movement of said gang means in either direction about said axis when said arm means is lowered to raise said frame into a transport position, said motion preventing means comprising a connection extending from said swingable gang means to said arm means and movable with the latter relative to said frame, said connection reacting against said frame.

2. In a disk harrow, a main frame including a central fore-and-aft extending frame bar extending rearwardly of the forward portion of said main frame, a front disk gang assembly fixed to the front portion of said main frame, a rear disk gang assembly swingably connected with the rear portion of said frame bar rearwardly of said main frame, and means acting between the latter and said rear gang assembly for holding the latter against swinging on said rearwardly extending frame bar.

3. In a disk-harrow, a main frame including a central fore-and-aft extending frame bar extending rearwardly of the forward portion of said main frame, a front disk gang assembly fixed to the front portion of said main frame, a rear disk gang asesmbly swingably connected with the rear portion of said frame bar rearwardly of said main frame, and means disposed at each side of said axis and spaced laterally outwardly therefrom for holding the rear gang assembly against swinging on said rearwardly extending frame bar, each of said last mentioned means including a part connected with said rear gang assembly and reacting against the main frame.

4. In a disk harrow, a main frame including a central fore-and-aft extending frame bar extending rearwardly of the forward portion of said main frame, a front disk gang assembly fixed to the front portion of said main frame, a rear disk gang asesmbly swingably connected with the rear portion of said frame bar rearwardly of said main frame, means to raise and lower said main frame into and out of transport position, and means acting between the main frame and the rear gang assembly and connected with said raising and lowering means for holding the rear gang assembly against swinging in either direction about said frame bar.

5. In a disk harrow, a main frame, a front disk gang assembly fixed to the forward portion of said main frame, a rear disk gang assembly pivoted at a midpoint to said main frame for movement relative thereto about a central fore-and-aft extending axis, and means operative to connect each end of said rear disk gang assembly to the said main frame when the latter is raised to prevent swinging of the latter in either direction about said axis.

6. In a disk harrow of the wheel supported type, a generally transverse main frame, a transverse front disk gang assembly connected therewith, a wheel frame connected with said main frame and including a pair of wheel-carrying arms swingable relative to the main frame to raise and lower the latter, a rear disk gang assembly pivoted to said main frame for movement relative thereto about a generally central fore-and-aft extending axis, and means operatively connected with said arms and said rear disk gang assembly, said means comprising a pair of guides connected with said main frame at opposite sides of said axis, and a pair of lifting elements extending from said rear gang assembly over said guides to said arms to be operated by the latter when the wheel arms are swung downwardly relative to said main frame to raise the latter and said gang assemblies.

7. In a disk harrow of the wheel supported type, a generally transverse main frame, a transverse front disk gang assembly connected therewith, a wheel frame connected with said main frame and including a pair of wheel-carrying arms swingable relative to the main frame to raise and lower the latter, a rear disk gang assembly pivoted to said main frame for movement relative thereto about a generally central fore-and-aft extending axis, and means operatively connected with said arms and said rear disk gang assembly, said means comprising a pair of guides connected with the rear upper portions of said main frame at opposite sides of said axis, and a pair of lifting elements extending from the upper forward portions of said rear gang assembly over said guides to said arms to be operated by the latter when the wheel arms are swung downwardly relative to said main frame to raise the latter and said gang assemblies.

8. In a wheel harrow, a main frame, a wheel-carrying arm means swingably connected with said frame, a gang frame swingably connected with said main frame to move relative thereto about an axis, gang frame locking means connected with said arm means so as to be moved thereby relative to the main frame when the arm means is lowered to raise the main frame, and means connecting said gang locking means with said gang frame at opposite sides of said axis so as to hold said gang frame against movement in either direction about said axis relative to said main frame when said arm means is shifted downwardly relative to said main frame.

9. In a disk harrow, a main frame including a central fore-and-aft extending frame bar extending rearwardly of the forward portion of said main frame, means including swingable arm means connected with the main frame to raise the latter into a transport position, a front disk gang assembly fixed to the front portion of said main frame, a rear disk gang assembly swingably connected at a midpoint with the rear portion of the forward portion of said frame bar rearwardly of said main frame, and means acting between the latter and said rear gang assembly for restraining the latter against swinging in either direction on said rearwardly extending frame bar, when said arm means is lowered to raise said frame into a transport position.

10. In a disk harrow, a main frame including a central fore-and-aft extending frame bar extending rearwardly of said main frame, a front disk gang assembly fixed to the front portion of said main frame, a rear disk gang assembly swingably connected with the rear portion of said frame bar rearwardly of said main frame, and oscillation lock-out means disposed at each side of said axis and spaced laterally outwardly therefrom for holding the rear gang assembly against swinging on said rearwardly extending frame bar, each of said last mentioned means including a part movably mounted on one of said main frame and rear gang assembly and carrying means engaging the other of said main frame and rear gang assembly and resilient means acting against said part, said resilient means being constructed and arranged to exert sufficient force normally to hold said rear gang assembly against movement in either direction relative to the main frame during transport.

References Cited in the file of this patent

UNITED STATES PATENTS

| 2,398,147 | McKay | Apr. 9, 1946 |
| 2,754,647 | Bennett et al. | July 17, 1956 |
| 2,755,613 | Oehler et al. | July 24, 1956 |
| 2,765,609 | Oehler et al. | Oct. 9, 1956 |